United States Patent
McLaughlin et al.

(10) Patent No.: US 10,118,638 B2
(45) Date of Patent: Nov. 6, 2018

(54) MOTOR DRIVEN POWER STEERING SYSTEM AND CONTROL METHOD THEREOF

(71) Applicant: HYUNDAI MOBIS CO., LTD., Seoul (KR)

(72) Inventors: Kevin McLaughlin, Berkley, MI (US); Hyung Ju Kwon, Yongin-si (KR); Jonah Shapiro, Ann Arbor, MI (US)

(73) Assignee: HYUNDAI MOBIS CO., LTD., Seoul (KR)

( * ) Notice: Subject to any disclaimer, the term of this patent is extended or adjusted under 35 U.S.C. 154(b) by 28 days.

(21) Appl. No.: 15/371,067

(22) Filed: Dec. 6, 2016

(65) Prior Publication Data

US 2017/0158230 A1 Jun. 8, 2017

(30) Foreign Application Priority Data

Dec. 7, 2015 (KR) .......................... 10-2015-0173329

(51) Int. Cl.
*B62D 6/00* (2006.01)
*B62D 5/04* (2006.01)
*B62D 15/02* (2006.01)

(52) U.S. Cl.
CPC ............. *B62D 6/00* (2013.01); *B62D 5/0463* (2013.01); *B62D 15/021* (2013.01)

(58) Field of Classification Search
CPC ........... B62D 5/0463; B62D 6/00; B62D 6/10
See application file for complete search history.

(56) References Cited

U.S. PATENT DOCUMENTS

| | | | | |
|---|---|---|---|---|
| 5,704,446 A | * | 1/1998 | Chandy | B62D 5/0466 180/446 |
| 5,907,277 A | * | 5/1999 | Tokunaga | B62D 5/0463 180/412 |
| 5,996,724 A | * | 12/1999 | Shimizu | B62D 6/00 180/446 |

(Continued)

FOREIGN PATENT DOCUMENTS

| | | | | |
|---|---|---|---|---|
| JP | 2000-43742 A | | 2/2000 | |
| JP | 2001239952 A | * | 9/2001 | B62D 5/0466 |

(Continued)

OTHER PUBLICATIONS

JPO machine translation of JP 2004-098841 (original JP document published Apr. 2, 2004) (Year: 2004).*

(Continued)

*Primary Examiner* — Behrang Badii
*Assistant Examiner* — David A Testardi
(74) *Attorney, Agent, or Firm* — Knobbe Martens Olson & Bear LLP

(57) ABSTRACT

A motor driven power steering (MDPS) system may include: a torque sensor configured to measure a steering torque caused by a steering operation of a driver; a steering angle sensor configured to measure a steering angle of the steering operation; and a controller configured to determine a control torque according to the steering angle measured through the steering angle sensor, calculate an input torque based on the control torque and the steering torque measured through the torque sensor, and determine an assist torque based on the calculated input torque.

4 Claims, 6 Drawing Sheets

(56) References Cited

U.S. PATENT DOCUMENTS

| | | | | |
|---|---|---|---|---|
| 9,718,492 B2* | 8/2017 | Tamaizumi | B62D 5/0469 | |
| 2003/0074120 A1* | 4/2003 | Kleinau | B62D 5/0463 | 701/41 |
| 2004/0226770 A1* | 11/2004 | Nishiyama | B62D 5/0463 | 180/446 |
| 2005/0061577 A1* | 3/2005 | Shimizu | B62D 5/0463 | 180/446 |
| 2011/0010054 A1* | 1/2011 | Wilson-Jones | B62D 5/0463 | 701/42 |
| 2013/0151079 A1* | 6/2013 | Sworn | B62D 5/0463 | 701/42 |
| 2014/0005891 A1* | 1/2014 | Brown | B62D 6/008 | 701/41 |
| 2015/0094912 A1* | 4/2015 | Sukaria | B62D 5/0472 | 701/41 |
| 2016/0251027 A1* | 9/2016 | Farrelly | B62D 5/0463 | 701/41 |

FOREIGN PATENT DOCUMENTS

| | | | |
|---|---|---|---|
| JP | 2004-90834 A | | 3/2004 |
| JP | 2004-131046 A | | 4/2004 |
| JP | 2004098841 A | * | 4/2004 |
| JP | 2005219587 A | * | 8/2005 |
| JP | 2006-88866 A | | 4/2006 |
| JP | 2006131074 A | * | 5/2006 |
| JP | 2007137382 A | * | 6/2007 |
| JP | 2007168618 A | * | 7/2007 |
| JP | 2008230580 A | * | 10/2008 |
| KR | 10-2010-0056312 A | | 5/2010 |

OTHER PUBLICATIONS

Notice of Allowance dated Mar. 2, 2017 of corresponding Korean Patent Application No. 10-2015-0173329—2 pages.

* cited by examiner

MOTOR DRIVEN POWER STEERING SYSTEM AND CONTROL METHOD THEREOF

CROSS-REFERENCES TO RELATED APPLICATIONS

The present application claims priority to Korean application number 10-2015-0173329, filed on Dec. 7, 2015, which is incorporated by reference in its entirety.

BACKGROUND OF THE INVENTION

The present invention relates to a power steering system of a vehicle, and more particularly, to a motor driven power steering (MDPS) system and a control method thereof.

A power steering system of a vehicle is a steering device based on power, and serves to assist a driver to operate a steering wheel. Conventionally, a hydraulic power steering system has been used as the power steering. Recently, however, the use of an MDPS system which uses a motor force has increased. That is because the MDPS system has a smaller weight and occupies a smaller area than the existing hydraulic power steering system, and does not require oil change.

The MDPS system provides a part of torque which a driver must apply to a steering wheel during a steering operation, using an auxiliary power source, thereby enabling the driver to easily perform the steering operation. That is, a torque sensor connected to the steering wheel senses a steering intention of the driver, and the MDPS system receives the sensing signal and drives a motor to provide a suitable force in consideration of the current speed of the vehicle, thereby assisting the steering force. In general, during a parking operation or low-speed operation of the vehicle, the MDPS system provides a large force to lighten the force of the driver. During a high-speed operation, however, the MDPS system provides only a small force to maintain the stability of the vehicle body.

The MDPS system includes various types of control logic such as logic for realizing a steering feel desired by a driver, logic for improving the stability of the vehicle, and logic for improving the stability of the system. However, based on the basic principle that a torque value sensed through a torque sensor is inputted to a boost function to calculate a basic assist torque, the control logic of the MDPS system determines the final assist force by adding or subtracting various compensation values to or from the assist torque.

The related art of the present invention is disclosed in Korean Patent Laid-open Publication No. 10-2010-0056312 published on May 27, 2010.

In such an MDPS system, when a load is changed by disturbance, the load change causes a variation in torque caused by a driver. The load indicates a value which maintains the equilibrium with the sum of the torque by the driver and the assist torque. At this time, an assist force to overcome the variation is generated in proportion to a boost gain (the slope of the boost function). Thus, as the boost gain is increased, the MDPS system is resistant to disturbance.

However, in the conventional assist torque calculation method, when the target value of steering feel is set, a boost gain for each torque value is determined. The steering feel indicates how heavily a driver feels steering. Thus, since the boost gain cannot be freely controlled, the MDPS system is vulnerable to disturbance.

Furthermore, since the relation between the target value of the steering feel and the boost gain is not established, the boost gain is not calculated according to the target value of the steering feel, but determined through a tuning process in which changing the boost gain and checking the steering feel based on the changed boost gain are repeated. Thus, the system tuning process requires a large amount of time, and the precision of the system tuning process is reduced.

SUMMARY OF THE INVENTION

Embodiments of the present invention are directed to a motor driven power steering (MDPS) system capable of simplifying a system tuning process while having resistance to disturbance, and improving the precision of the system tuning process, and a control method thereof.

In one embodiment, a motor driven power steering (MDPS) system may include: a torque sensor configured to measure a steering torque caused by a steering operation of a driver; a steering angle sensor configured to measure a steering angle of the steering operation; and a controller configured to determine a control torque according to the steering angle measured through the steering angle sensor, calculate an input torque based on the control torque and the steering torque measured through the torque sensor, and determine an assist torque based on the calculated input torque.

The controller may calculate the input torque by subtracting the control torque from the steering torque.

A relation $f_s$ between the steering angle $\theta$ and the control torque $f_s(\theta)$ may be derived in consideration of a boost gain, a steering gain, and a boost gain considering only the steering torque.

The boost gain considering only the steering torque may have a relation expressed as following Equation 1:

$$K_b = \frac{M_g}{S_g} - 1,$$

where $K_b$ represents the boost gain considering only the steering torque, $M_g$ represents a constant based on a vehicle characteristic, and $S_g$ represents the steering gain.

The relation $f_s$ may be derived through following Equation 2:

$$\frac{\partial f_s}{\partial \theta} = \left(\frac{K_B - K_b}{K_B}\right) \times g_v \times S_g$$

where $K_B$ represents the boost gain, $K_b$ represents the boost gain considering only the steering torque, $g_v$ represents a constant, and $S_g$ represents the steering gain.

A torque point at which the boost gain is calculated and a torque point at which the boost gain considering only the steering torque is calculated may have different values.

A value obtained by substituting the torque point at which the boost gain is calculated in a boost function based on the boost gain and a value obtained by substituting the torque point at which the boost gain considering only the steering torque is calculated in the boost function based on the boost gain considering only the steering torque may be equal to each other.

The torque point at which the boost gain considering only the steering torque is calculated may be determined according to the steering gain.

The boost gain may have a larger value than the boost gain considering only the steering torque, based on the same torque point.

In another embodiment, a control method of an MDPS system may include: measuring, by a controller, a steering torque caused by a steering operation of a driver; measuring a steering angle of the steering operation; determining a control torque according to the measured steering angle; calculating an input torque based on the measured steering torque and the determined control torque; and determining an assist torque according to the calculated input torque.

In the calculating of the input torque, the controller may calculate the input torque by subtracting the control torque from the steering torque.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
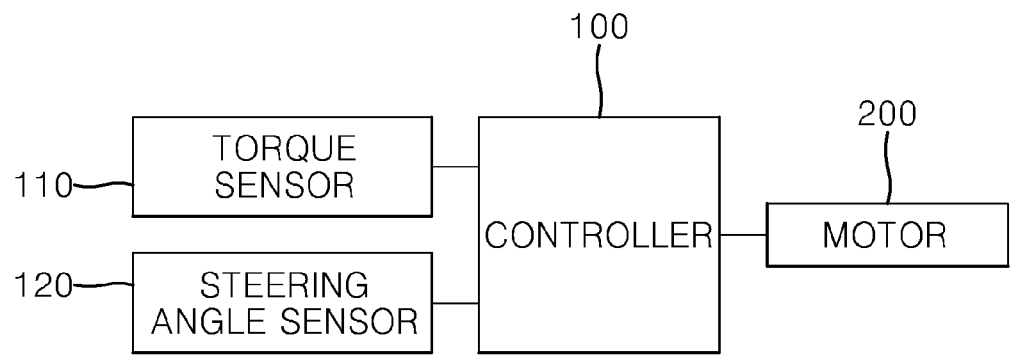
FIG. 1 is a block diagram illustrating the configuration of an MDPS system in accordance with an embodiment of the present invention.
Figure 2:
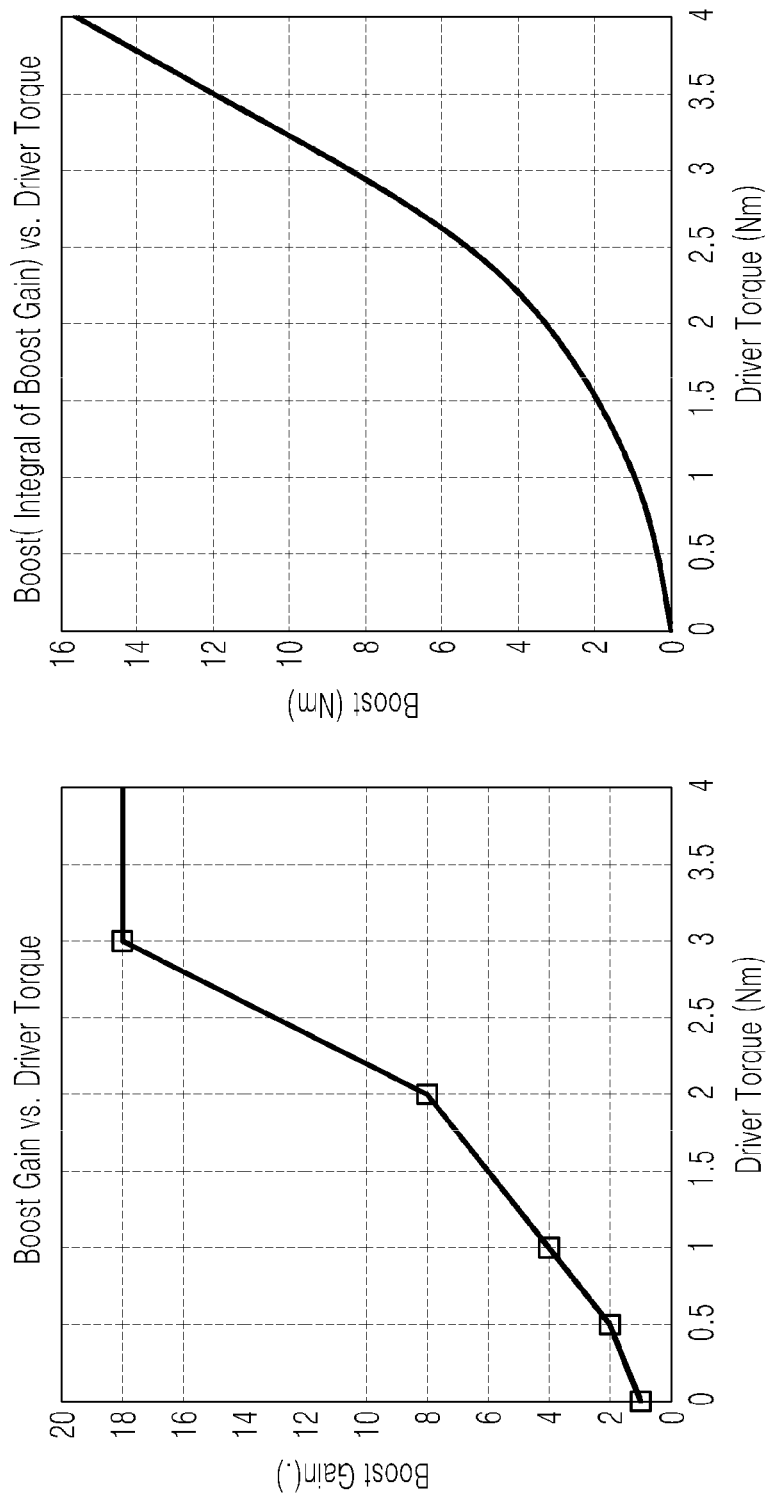
FIG. 2 is a diagram for describing a boost gain in the MDPS system in accordance with the embodiment of the present invention.
Figure 3:
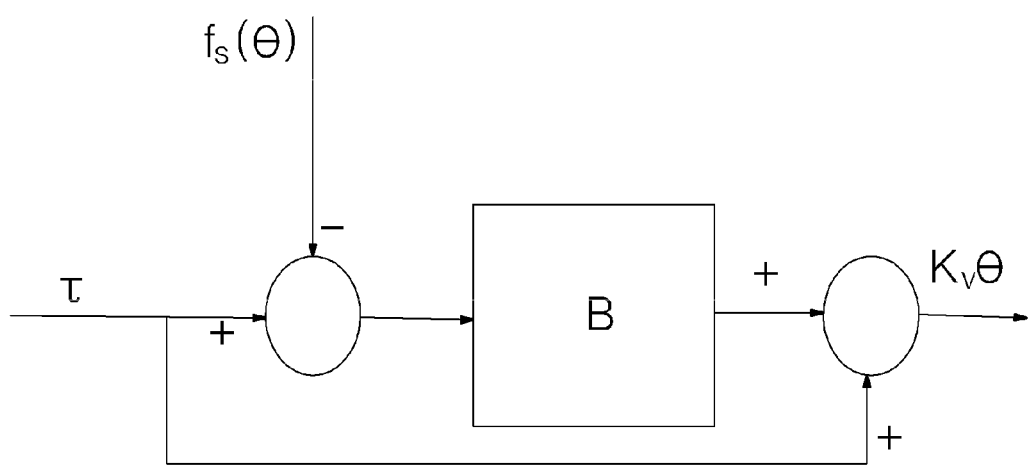
FIG. 3 is a diagram for describing an operating method of the MDPS system in accordance with the embodiment of the present invention.
Figure 4:
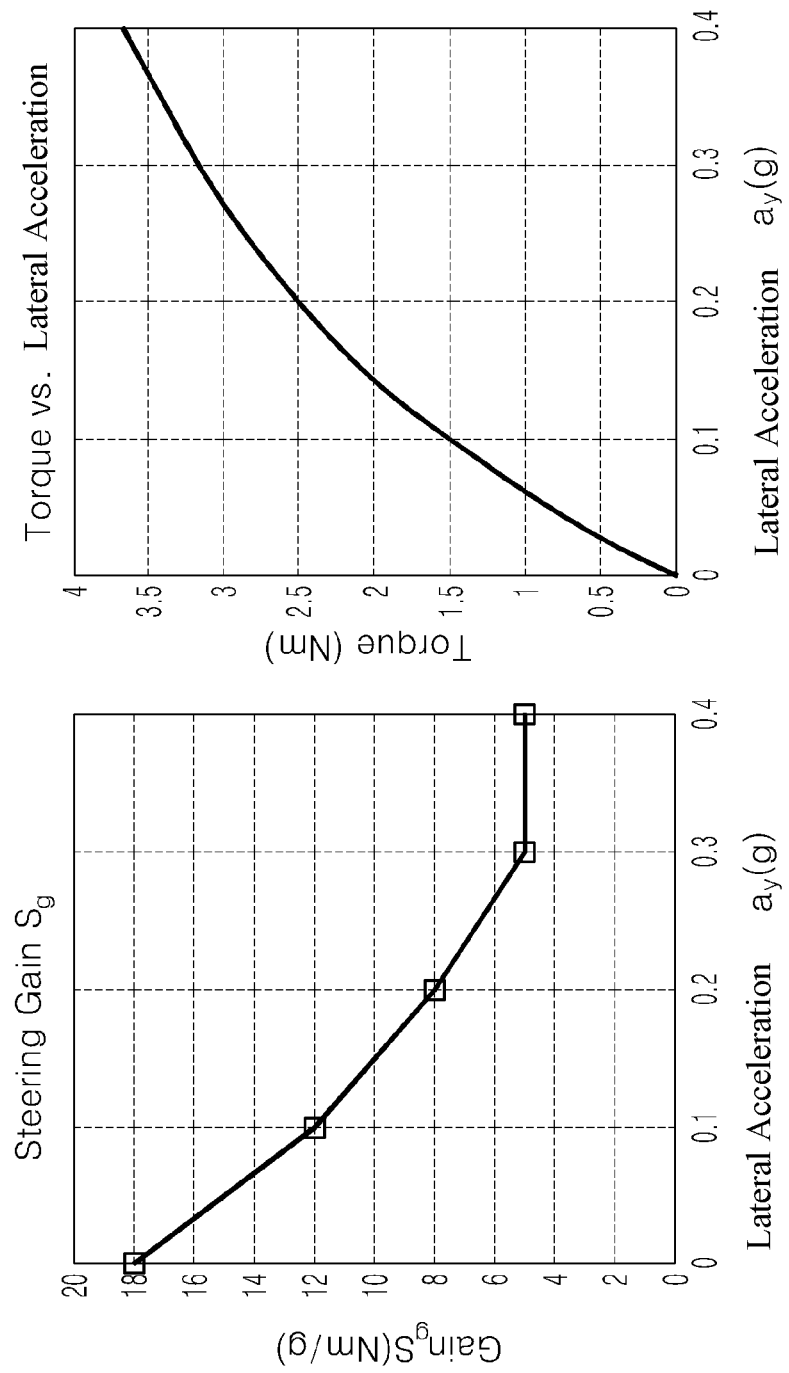
FIG. 4 is a diagram for describing a steering gain in the MDPS system in accordance with the embodiment of the present invention.
Figure 5:
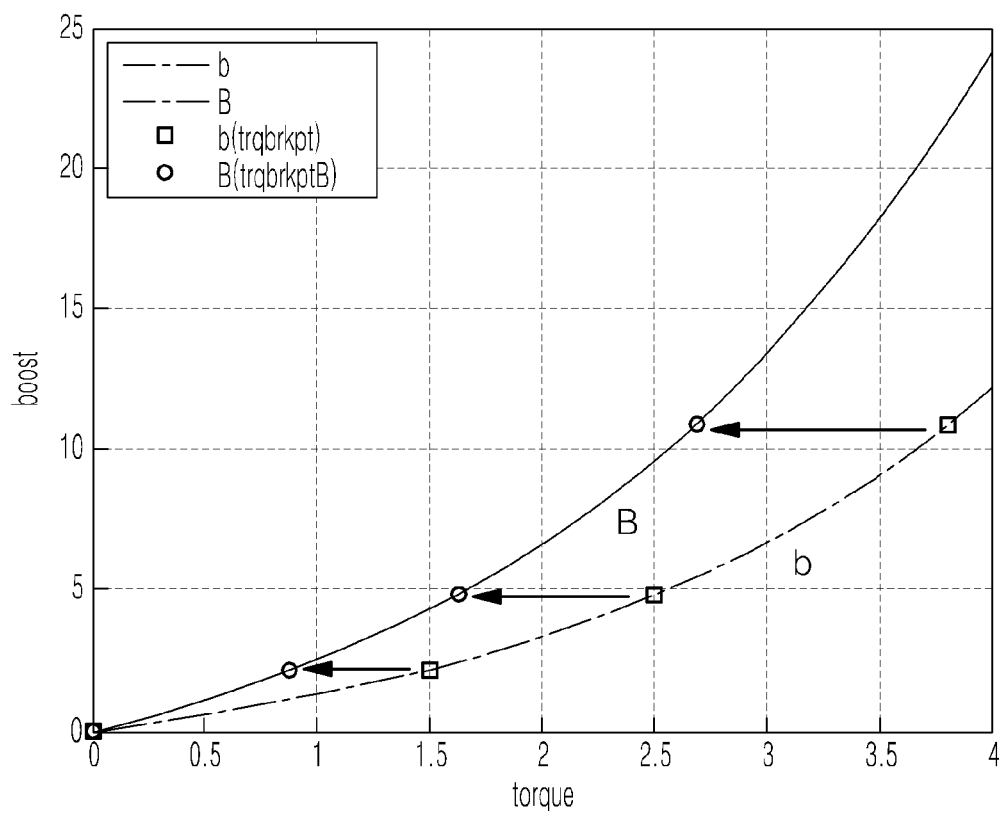
FIG. 5 is a diagram for describing a boost function in the MDPS system in accordance with the embodiment of the present invention.

FIG. 1 is a block diagram illustrating the configuration of an MDPS system in accordance with an embodiment of the present invention. FIG. 2 is a diagram for describing a boost gain in the MDPS system in accordance with the embodiment of the present invention. FIG. 3 is a diagram for describing an operating method of the MDPS system in accordance with the embodiment of the present invention. FIG. 4 is a diagram for describing a steering gain in the MDPS system in accordance with the embodiment of the present invention. FIG. 5 is a diagram for describing a boost function in the MDPS system in accordance with the embodiment of the present invention. Referring to FIGS. 1 to 5, the MDPS system in accordance with the embodiment of the present invention will be described as follows.

As illustrated in FIG. 1, the MDPS system in accordance with the embodiment of the present invention may include a controller 100, a torque sensor 110, and a steering angle sensor 120.

The torque sensor 110 may measure a steering torque caused by a steering operation of a driver, and the steering angle sensor 120 may measure a steering angle of the steering operation of the driver.

The controller 100 may calculate an assist torque of the MDPS system according to the measurement results obtained through the torque sensor 110 and the steering angle sensor 120. Thus, the controller 100 may control the motor 200 to assist a steering force.

More specifically, the controller 100 may calculate a control torque according to the steering angle measured through the steering angle sensor 120, calculate an input torque based on the steering torque measured through the torque sensor 110 and the calculated control torque, and determine the assist torque by inputting the calculated input torque to a boost function.

In the conventional MDPS system, a measured steering torque is directly inputted to a boost function. Thus, the conventional MDPS system has only a single degree of freedom, and thus cannot change the boost function (that is, the conventional MDPS system cannot change the boost gain). In the present embodiment, however, the MDPS system additionally calculates the control torque and calculates the input torque inputted to the boost function. Therefore, although the boost gain is changed, the MDPS system may enable the driver to have the same steering feel.

The boost gain is the slope of the boost function where the x-axis is the driver torque and the y-axis is the boost as illustrated in FIG. 2. The boost gain may be specified at discrete driver torques (specific points) and assumed to be a linear function between the points. The boost (the boost function) is the integral of the boost gain curve.

The controller 100 may calculate the input torque by subtracting the control torque from the steering torque, and the operation of the MDPS system in this case may be performed as illustrated in FIG. 3.

That is, as illustrated in FIG. 3, a value obtained by subtracting a control torque $f_s(\theta)$ from a steering torque $\tau$ caused by a user's operation may be inputted to a boost function B and outputted as an assist torque, and a value obtained by adding the assist torque and the steering torque may be set to the total torque. The total torque may maintain the equilibrium with the load $K_v\theta$ of the vehicle. That is, $K_v(=\tau_T/\theta)$ may be defined as a change of the total torque with respect to the unit steering angle change.

Furthermore, $K_v$ is a constant value, but may be changed according to the speed of the vehicle. In the present embodiment, most values such as the boost function (boost gain) may be changed according to the speed of the vehicle. In other words, the controller 100 may select a boost function according to the speed of the vehicle, measured through a speed sensor (not illustrated), and determine an assist torque. Hereafter, a boost function and a steering gain for one vehicle speed will be described. However, a different boost function and a different steering gain may be set for each vehicle speed.

As described above, the MDPS system in accordance with the embodiment of the present invention may adopt a control torque based on a steering angle and change a boost gain. The reason that the steering angle is set to a variable and the method for calculating the control torque will be described in more detail as follows.

First, vehicle parameters for calculating vehicle dynamics may be defined as follows. For example, $$g_v\left(=\frac{\partial a_y}{\partial \theta}\right)$$

may be defined as a change of lateral acceleration $a_y$ with respect to the unit steering angle change. At this time, $g_v$ may be expressed as the following equation through the vehicle dynamics calculation.

$$g_v = \left(\frac{1}{S_R}\right)\frac{V_x^2}{L - K_u V_x^2}$$

Here, L represents a wheel base of the vehicle, $S_R$ represents an overall steering ratio, $V_x$ represents a vehicle speed, and $K_u$ represents an understeer gradient. The overall steering ratio refers to a ratio of a tire angle to a steering angle.

That is, $g_v$ may have a different value according to the vehicle speed. At a specific vehicle speed, however, $g_v$ may be considered as a constant value.

Furthermore, a constant value based on the characteristic of the vehicle, that is, $M_g(=K_v/g_v)$ may be defined. Unlike $K_v$ or $g_v$, $M_g$ may have a constant value regardless of the vehicle speed.

The steering gain $$S_g\left(=\frac{\partial \tau}{\partial a_y}\right)$$

may be defined as an index indicating the target value of the steering feel. The extent to which the driver feels steering may be changed according to the steering gain. That is, the steering gain may serve as a reference value for tuning the MDPS system. As illustrated in FIG. 4, the target value of the steering gain may be set for each lateral acceleration. Furthermore, when the left graph indicating the relation between the lateral acceleration and the steering gain is integrated, the right graph which is used to evaluate the performance of the MDPS system may be obtained.

First, when a boost function in the method for calculating an assist torque in consideration of only a steering torque without considering a steering angle is represented by b, the following equation may be established.

$$b(\tau)+\tau=K_v\theta \quad (A1)$$

In this case, when a boost gain $$K_b\left(=\frac{\partial b}{\partial \tau}\right)$$

is derived through dynamics calculation, the boost gain may be expressed as Equation 1 below.

$$K_b = \frac{M_g}{S_g} - 1 \quad \text{[Equation 1]}$$

Specifically, when the equation A1 is implicitly differentiated with respect to $\theta$, the following equation may be derived.

$$\frac{\partial b(\tau)}{\partial \theta} + \frac{\partial \tau}{\partial \theta} = K_v \quad (A2)$$

At this time, when the chain rule is applied to $$\frac{\partial b(\tau)}{\partial \theta} \text{ and } \frac{\partial \tau}{\partial \theta},$$

the following equations may be established.

$$\frac{\partial b(\tau)}{\partial \theta} = \frac{\partial b}{\partial \tau}\frac{\partial \tau}{\partial \theta} = K_b \frac{\partial \tau}{\partial \theta} \quad (A3)$$

$$\frac{\partial \tau}{\partial \theta} = \frac{\partial \tau}{\partial a_y}\frac{\partial a_y}{\partial \theta} = S_g \times g_v \quad (A4)$$

When the equations A3 and A4 are substituted in the equation A2, the equation A2 may be arranged as follows. Thus, Equation 1 can be derived.

$$K_v = K_b\frac{\partial \tau}{\partial \theta} + \frac{\partial \tau}{\partial \theta} = (1+K_b)\frac{\partial \tau}{\partial \theta} = g_v S_g(1+K_b)$$

$$S_g(1+K_b) = \frac{K_v}{g_v} = M_g$$

That is, as shown in Equation 1, when the steering gain is not changed in the method for calculating an assist torque in consideration of only a steering torque, the boost gain may not be changed. In other words, since the target value of the steering gain is fixed, the boost gain (that is, the boost function) cannot be changed in order to secure resistance to disturbance.

Thus, in order to maintain the same steering gain while the boost gain is increased to secure resistance to disturbance, a value inputted to the boost function needs to be reduced. In the present embodiment, the control torque may be set to such a value.

That is, when the boost function of the MDPS system in accordance with the embodiment of the present invention is represented by "B" and $f_s$ which satisfies $b(\tau)+\tau=K_v\theta$ ... (B1) and $B(\tau-f_s)+\tau=K_v\theta$ ... (B2) is derived, the same steering gain may be maintained while the boost gain is increased.

Finally, when the dynamics calculation is performed, Equation 2 below may be obtained.

$$\frac{\partial f_s}{\partial \theta} = \left(\frac{K_B - K_b}{K_B}\right) \times g_v \times S_g \quad \text{[Equation 2]}$$

In Equation 2, $K_B$ represents a boost gain in the present embodiment, and $K_b$ represents a boost gain considering only the steering torque.

Specifically, when the equations B1 and B2 are arranged and $\tau-f_s$ is defined as $\hat{\tau}$, the following equation may be derived.

$$b(\tau)=B(T-f_s)=B(\hat{\tau}) \quad (B3)$$

When the equation B3 is implicitly differentiated with respect to $\theta$ which guarantees that a differential coefficient is calculated at the equivalent operation point, the equation B3 may be expressed as follows.

$$\left.\frac{\partial b}{\partial \theta}\right|_{\tau=\tau_0} = \left.\frac{\partial B}{\partial \theta}\right|_{\hat{\tau}=\hat{\tau}_0}, \Rightarrow b(\tau_0) = B(\hat{\tau}_0) \quad \text{(B4)}$$

Then, when the equation B4 is expanded through the chain rule, the equation B4 may be expressed as follows.

$$\left(\left.\frac{\partial b}{\partial \tau}\right|_{\tau=\tau_0} \frac{\partial \tau}{\partial \theta}\right) = \left(\left.\frac{\partial B}{\partial \hat{\tau}}\right|_{\hat{\tau}=\hat{\tau}_0} \frac{\partial \hat{\tau}}{\partial \theta}\right) = \left.\frac{\partial B}{\partial \hat{\tau}}\right|_{\hat{\tau}=\hat{\tau}_0} \left(\frac{\partial \tau}{\partial \theta} - \frac{\partial f_g}{\partial \theta}\right) \quad \text{(B5)}$$

At this time, when $$\left.\frac{\partial b}{\partial \tau}\right|_{\tau=\tau_0}$$

is represented by $K_b$ and $$\left.\frac{\partial B}{\partial \hat{\tau}}\right|_{\hat{\tau}=\hat{\tau}_0}$$

is represented by $K_B$, the equation B5 may be arranged as follows. Thus, the above-described equation A4 can be reused to derive Equation 2.

$$\frac{\partial f_s}{\partial \theta} = \frac{K_B - K_b}{K_B} \frac{\partial \tau}{\partial \theta}$$

That is, as shown in Equation 2, the control torque needs to be determined using the steering angle as an input variable. Although a user changes the boost gain $K_B$, the steering gain may not be changed by the control torque.

Furthermore, as the boost gain $K_B$ has a large value, resistance to disturbance can be secured. Thus, in the present embodiment, the boost gain $K_B$ may have a larger value than the boost gain $K_b$ considering only a steering torque, based on the same torque point (torque break point). For example, the boost gain $K_B$ in accordance with the embodiment of the present invention may be obtained by multiplying a constant value (for example, 2) by the boost gain $K_b$ considering only the steering torque.

FIG. 5 illustrates a boost function based on the boost gain $K_B$ larger than the boost gain considering only the steering torque and a boost function based on the boost gain $K_b$ considering only the steering torque.

As confirmed during the derivation process for Equation 2, the boost gain $K_B$ for deriving the relation between the steering angle θ and the control torque $f_s(\theta)$, that is, a stiffness function ($f_s(\theta)$) and the boost gain $K_b$ considering only the steering torque for deriving the relation correspond to values calculated at specific torque points.

At this time, the torque point at which the boost gain $K_B$ is calculated and the torque point at which the boost gain $K_b$ considering only the steering torque is calculated may be different from each other. Specifically, the torque points may correspond to values expressed in the equation B4.

Referring to FIGS. 4 and 5, the relation between the torque points will be described in more detail as follows.

As described above, the target value of the steering gain may be set to each lateral acceleration. When the left graph of FIG. 4 indicating the relation between lateral accelerations and steering gains is integrated, the right graph of FIG. 4 indicating the relation between lateral accelerations and torques may be acquired.

That is, when the steering gain is set, torque values corresponding to the respective lateral accelerations may be determined. The torque values may be set to the torque points at which the boost gain $K_b$ considering only the steering torque is calculated. For example, in FIG. 4, 0, 1.5, 2.5, and 3.8 may be used as the torque points at which the boost gain $K_b$ considering only the steering torque is calculated.

Furthermore, as described above, the torque point at which the boost gain $K_B$ is calculated may be different from the torque point at which the boost gain $K_b$ considering only the steering torque is calculated. Specifically, a value obtained by substituting the torque point at which the boost gain $K_B$ is calculated in the boost function B based on the boost gain $K_B$ and a value obtained by substituting the torque point (for example, 0, 1.5, 2.5, or 3.8) at which the boost gain $K_b$ considering only the steering torque is calculated in the boost function b based on the boost gain $K_b$ considering only the steering torque may be set to the same value.

That is, as illustrated in FIG. 5, new torque points corresponding to 0, 1.5, 2.5, and 3.8 may be calculated. For example, in FIG. 5, 0, 0.8741, 1.6246, and 2.6829 may be used as torque points at which the boost gain $K_B$ is calculated.

In other words, when the lateral acceleration is 0.1 (g), the boost gain $K_b$ considering only the steering torque and calculated to derive the stiffness function is calculated at the torque point of 1.5 Nm, and the boost gain $K_B$ calculated to derive the stiffness function maybe calculated at the torque point of 0.8741 Nm.

As such, when the boost gain $K_B$ and the boost gain $K_b$ considering only the steering torque are not calculated at different point where the respective boost functions have the same value, the stiffness function may become inaccurate. Thus, the steering gain may be changed by the control torque. Therefore, the above-described determination of the torque points may be considered as an important factor which guarantees a normal operation of the MDPS system and the control method thereof in accordance with the embodiment of the present invention.

When the stiffness function is derived according to the above-described method, the calculated stiffness function may also be calculated at break points. At this time, the steering angle break points may be calculated at the respective lateral accelerations, based on the relation of $g_y$ ($a_y = g_y \theta$).

Figure 6:
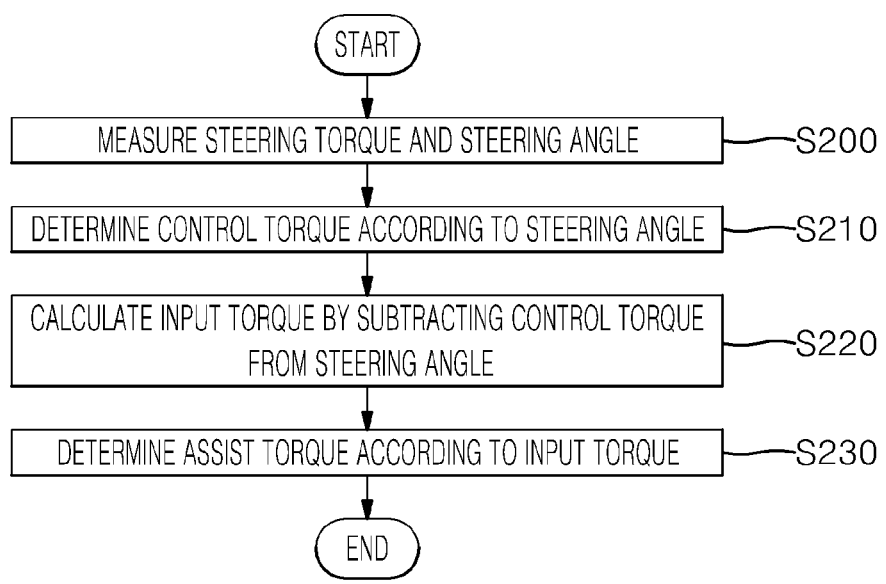
FIG. 6 is a flowchart for describing a control method of an MDPS system in accordance with an embodiment of the present invention.

FIG. 6 is a flowchart for describing a control method of an MDPS system in accordance with an embodiment of the present invention. Referring to FIG. 6, the control method of the MDPS system in accordance with the embodiment of the present invention will be described as follows.

As illustrated in FIG. 6, the controller 100 may measure a steering torque and a steering angle at step S200. For example, the controller 100 may measure a steering torque caused by a steering operation of a driver, and the steering angle sensor 120 may measure a steering angle of the steering operation of the driver.

Then, the controller 100 may determine a control torque according to the steering angle at step S210. For example, the controller 100 may calculate the control torque by inputting the steering angle to a stiffness function $f_s(\theta)$. Furthermore, in order to improve the calculation speed, the stiffness function may be stored in the form of a table of output values based on steering angles. The controller 100 may determine the control torque using the table.

At this time, the stiffness function may be derived in consideration of a boost gain, a steering gain, and a boost gain considering only a steering torque. More specifically, the stiffness function may be derived through Equation 2 above.

After step S210, the controller 100 may calculate an input torque by subtracting the control torque determined at step S210 from the steering torque measured at step S200, at step S220. That is, in the present embodiment, the boost gain $K_B$ may have a larger value than the boost gain $K_b$ considering only a steering torque. Thus, in order to form the same steering feel, the input torque inputted to the boost function may have a value obtained by subtracting the control torque from the steering torque.

Then, the controller 100 may determine an assist torque according to the input torque calculated at step S220, at step S230. For example, the controller 100 may calculate the assist torque by inputting the input torque calculated at step S220 to the boost function B. In order to improve the calculation speed, the boost function may also be stored in the form of a table of output values based on input values. The controller 100 may determine the assist torque using the table.

As such, the MDPS system and the control method thereof in accordance with the embodiment of the present invention can change a boost gain by calculating an assist torque according to a steering torque and a control torque based on a steering angle, thereby securing resistance to disturbance. Furthermore, the MDPS system and the control method thereof may calculate control factors through the equations derived through the vehicle modeling method using dynamics calculation. Thus, the tuning process of the system can be simplified, and the precision of the tuning process can be improved.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor driven power steering (MDPS) system comprising:
    a torque sensor configured to measure a steering torque ($\tau$) caused by a steering operation of a driver;
    a steering angle sensor configured to measure a steering angle ($\theta$) of the steering operation; and
    a controller configured to:
        determine a control torque according to the steering angle measured through the steering angle sensor,
        calculate an input torque by subtracting the control torque from the steering torque measured through the torque sensor,
        determine an assist torque by applying a first boost gain ($K_B$) to the calculated input torque, wherein the first boost gain is determined using the steering torque ($\tau$) as an input to a predetermined function defining boost gain with respect to steering torque;
        cause a motor of the MDPS system to generate the assist torque such that the assist torque changes in consideration of the steering angle via the control torque;
    wherein the control torque is computed using the steering angle ($\theta$) and a stiffness function ($f_s$) satisfying the following Equation 1:

$$\frac{\partial f_s}{\partial \theta} = \left(\frac{K_B - K_b}{K_B}\right) \times g_v \times S_g,$$

where $S_g$ is a steering gain representing a desirable partial derivative of the steering torque with respect to a lateral acceleration of the vehicle, $g_v$ is a constant, $K_B$ is the first boost gain, and $K_b$ is a second boost gain to achieve the steering gain ($S_g$) assuming the assist torque from the motor is generated based on the steering torque ($\tau$) without considering the steering angle ($\theta$),
    wherein the second boost gain satisfies the following Equation 2:

$$K_b = \frac{M_g}{S_g} - 1,$$

where $M_g$ represents a constant based on a vehicle characteristic, and $S_g$ represents the steering gain.

2. The MDPS system of claim 1, wherein the first boost gain ($K_B$) has a larger value than the second boost gain ($K_b$).

3. A control method of an MDPS system, comprising:
    measuring, by a controller, a steering torque caused by a steering operation of a driver;
    measuring a steering angle of the steering operation;
    determining a control torque according to the measured steering angle;
    calculating an input torque by subtracting the control torque from the steering torque;
    determining an assist torque by applying a first boost gain ($K_B$) to the calculated input torque, wherein the first boost gain is determined using the steering torque ($\tau$) as an input to a predetermined function defining boost gain with respect to steering torque;
    controlling a motor of the MDPS system to generate the assist torque such that the assist torque changes in consideration of the steering angle via the control torque;
    wherein the control torque is computed using the steering angle ($\theta$) and a stiffness function ($f_s$) satisfying the following Equation 1:

$$\frac{\partial f_s}{\partial \theta} = \left(\frac{K_B - K_b}{K_B}\right) \times g_v \times S_g,$$

where $S_g$ is a steering gain representing a desirable partial derivative of the steering torque with respect to a lateral acceleration of the vehicle, $g_v$ is a constant, $K_B$ is the first boost gain, and $K_b$ is a second boost gain to achieve the steering gain ($S_g$) assuming the assist torque from the motor is generated based on the steering torque ($\tau$) without considering the steering angle ($\theta$), wherein the second boost gain satisfies the following Equation 2:

$$K_b = \frac{M_g}{S_g} - 1,$$

where $M_g$ represents a constant based on a vehicle characteristic, and $S_g$ represents the steering gain.

4. The control method of claim 3, wherein the first boost gain ($K_B$) has a larger value than the second boost gain ($K_b$).

* * * * *